US008014646B2

(12) United States Patent
Keith et al.

(10) Patent No.: US 8,014,646 B2
(45) Date of Patent: Sep. 6, 2011

(54) TELECOMMUNICATIONS PATCHING SYSTEMS WITH HIGH DENSITY PATCHING MODULES

(75) Inventors: Scott Martin Keith, Plano, TX (US); G. Mabud Choudhury, Warren, NJ (US); Chin Choi-Feng, Carrollton, TX (US); Gary E. Grimes, Roswell, GA (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 12/359,542

(22) Filed: Jan. 26, 2009

(65) Prior Publication Data

US 2010/0189403 A1    Jul. 29, 2010

(51) Int. Cl.
*G02B 6/00*    (2006.01)
(52) U.S. Cl. ........................................ 385/135; 385/134
(58) Field of Classification Search .................. 385/134, 385/135
See application file for complete search history.

(56) References Cited

U.S. PATENT DOCUMENTS

| 6,236,795 B1 | 5/2001 | Rodgers |
| 6,418,262 B1 | 7/2002 | Puetz et al. |
| 6,424,781 B1 | 7/2002 | Puetz et al. |
| 6,535,682 B1 | 3/2003 | Puetz et al. |
| 6,556,763 B1 | 4/2003 | Puetz et al. |
| 7,499,622 B2 * | 3/2009 | Castonguay et al. ......... 385/135 |
| RE41,460 E * | 7/2010 | Wheeler ........................ 385/135 |
| 2004/0175088 A1 * | 9/2004 | Dagley et al. ................. 385/135 |
| 2006/0018622 A1 * | 1/2006 | Caveney et al. .............. 385/135 |
| 2006/0275008 A1 | 12/2006 | Xin |
| 2007/0154158 A1 * | 7/2007 | Laurisch et al. .............. 385/135 |
| 2008/0085094 A1 | 4/2008 | Krampotich |
| 2008/0181571 A1 * | 7/2008 | Spisany et al. ................ 385/137 |
| 2008/0205843 A1 * | 8/2008 | Castonguay et al. ......... 385/135 |
| 2010/0129039 A1 * | 5/2010 | Smrha et al. .................. 385/134 |

FOREIGN PATENT DOCUMENTS

| DE | 20 2007 005 870 U1 | 7/2007 |
| WO | WO 99/42881 | 8/1999 |
| WO | WO 2009/032086 A2 | 3/2009 |

OTHER PUBLICATIONS

ADC Telecommunications, Inc. Brochure: "Room to Grow", one page, Website: www.adc.com/truenet, (2007).
International Search Report and Written Opinion of International Search Report for PCT/US2010/020688, mailed Mar. 29, 2010.

* cited by examiner

*Primary Examiner* — Rhonda Peace
(74) *Attorney, Agent, or Firm* — Myers Bigel Sibley & Sajovec

(57) ABSTRACT

A telecommunications patching system includes: a generally horizontal main panel; a row of front connectors associated with the main panel, each of the front connectors being spaced apart from immediately adjacent front connectors by a gap; and a row of rear connectors associated with the main panel, each of the rear connectors being spaced apart from immediately adjacent rear connectors by a gap. The front connectors are laterally offset from the rear connectors such that each of the gaps between the rear connectors aligns with a respective front connector, and each of the gaps between the front connectors aligns with a respective rear connector. In this configuration, cords or cables connected with the front row of connectors can reside in the gaps between the rear connectors, and cords or cable with the rear connectors can reside in the gaps between the front connectors. This arrangement can provide high port density to the patching system.

8 Claims, 6 Drawing Sheets

TELECOMMUNICATIONS PATCHING SYSTEMS WITH HIGH DENSITY PATCHING MODULES

FIELD OF THE INVENTION

The present invention relates generally to telecommunications equipment and more particularly to high-density fiber distribution apparatus.

BACKGROUND

In the telecommunications industry, the use of fiber optic cables for carrying transmission signals is rapidly growing. To interconnect fiber optic equipment, fiber hardware that mounts on distribution frames and racks have been developed. Such frames and racks are typically located in a communications closet, data room, or the like, where technicians can easily connect and reconnect, or "patch," equipment in an organized and efficient manner. Examples of fiber distribution frames and racks are shown in U.S. Pat. Nos. 5,497,444 and 5,758,003, which are hereby incorporated by reference.

With the increase in use of fiber optic cables in the telecommunications industry, it is desirable to provide fiber distribution frames/racks with increased connector port density. "Density" refers to the number of locations, or ports, per unit volume or unit area for providing connections within the frame/rack; thus, increased density can provide more connection/patching sites per frame/rack. Many frames/racks are configured to include multiple shelves or trays of a specific size (a standard height of 1.75 inches is known in the industry as a "rack unit" or "U"); the height of a shelf may be described in terms of "U" (e.g., a "6U" shelf), and the shelves and trays may be described by the number of connections per "U" (e.g., 48 connections/U).

The space constraints associated with high-density fiber distribution frames/racks can cause cable and cord management problems. Effective cable/cord management can prevent excessive bending of fiber optic cables/cords within the frames. Effective cable/cord management may also reduce tangling of cables and cords, and may provide improved accessibility to components that may require servicing. Easily-understood labeling can also improve operator efficiency and accuracy. However, increased density can hamper desirable cable management practices.

SUMMARY

As a first aspect, embodiments of the present invention are directed to a telecommunications patching system. The telecommunications patching system comprises: a main panel; a row of front connectors associated with the main panel, each of the front connectors being spaced apart from immediately adjacent front connectors by a gap; and a row of rear connectors associated with the main panel, each of the rear connectors being spaced apart from immediately adjacent rear connectors by a gap. The front connectors are laterally offset from the rear connectors such that each of the gaps between the rear connectors generally aligns with a respective front connector, and each of the gaps between the front connectors generally aligns with a respective rear connector. In this configuration, cords or cables connected with the front row of connectors can reside in the gaps between the rear connectors, and cords or cable with the rear connectors can reside in the gaps between the front connectors. This arrangement can provide high port density to the patching system.

As a second aspect, embodiments of the present invention are directed to a telecommunications patching system, comprising: a main panel; a row of front connectors associated with the main panel; and a row of rear connectors associated with the main panel. At least one of the row of front connectors and the row of rear connectors is mounted on a first connector lift mounted to the main panel, the first connector lift being configured to move the connectors mounted thereon between a retracted position and a raised position. This configuration can enable a technician to more easily access the connectors during the performance of work thereon.

As a third aspect, embodiments of the present invention are directed to a telecommunications patching system comprising a pair of carriers, each of the carriers comprising: a main panel; a row of front connectors associated with the main panel; and a row of rear connectors associated with the main panel. The patching systems are arranged in vertically stacked relationship. The height of the pair of patching systems is about 1 U.

DETAILED DESCRIPTION

Figure 1:
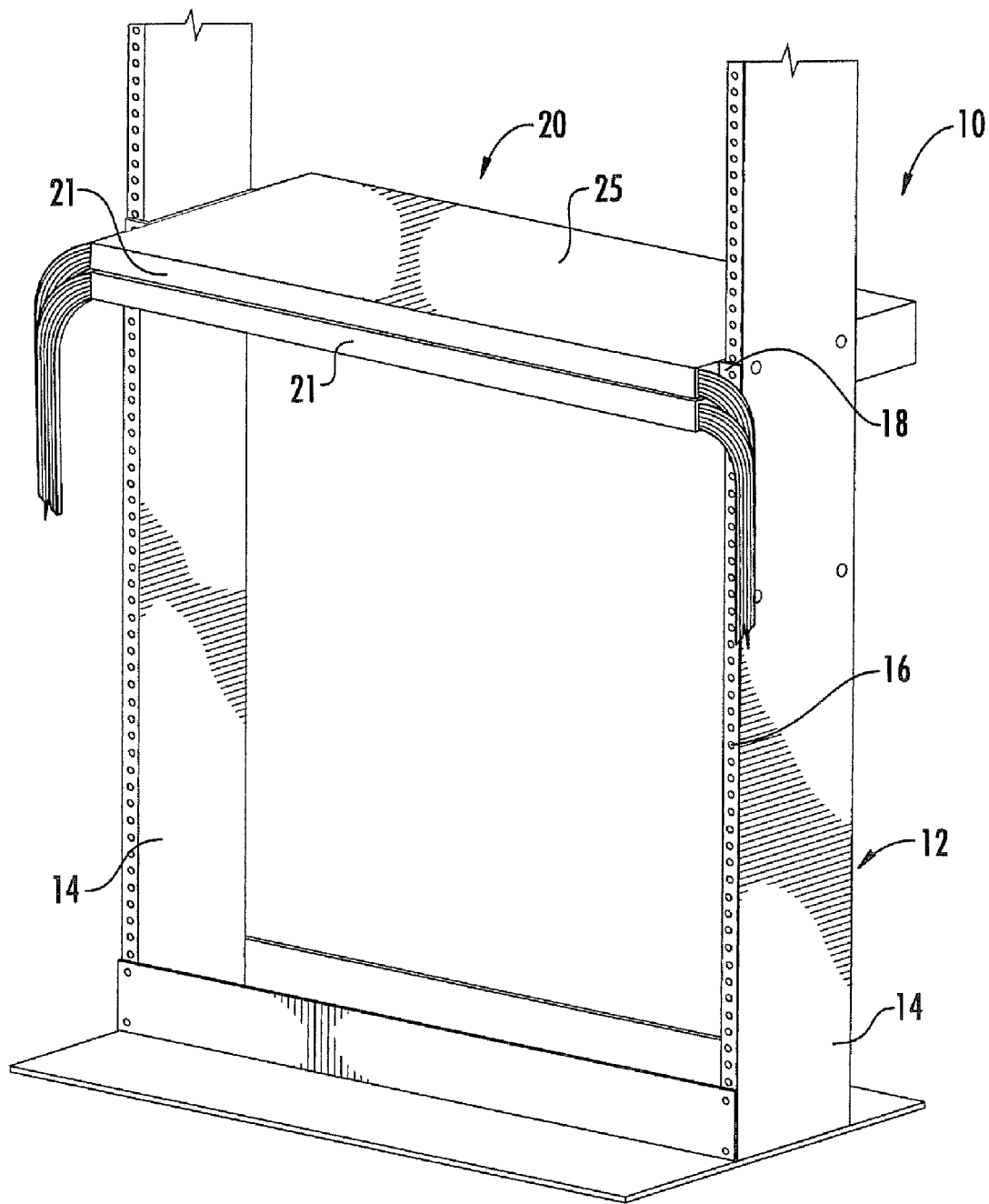
FIG. 1 is a front perspective view of a telecommunications patching assembly with a patching system according to embodiments of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly. As used herein, "vertical" has the conventional meaning, i.e., upright; or at a right angle to the horizon, and "horizontal" as the conventional meaning of being coplanar to the horizon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Also, as used herein the term "connector" is intended to encompass telecommunications connectors and devices employed to facilitate the interconnection of telecommunications cords and cables for the transmission of signals therebetween. A connector may include a termination device at the end of a cord or cable, an adapter that facilitates the interconnection of two termination devices (as may be employed in the interconnection of fiber optic cords and cables, such as may be found in a connector block), a jack, plug, or the like typically employed with copper cables and cords, or other devices that provide a location for the interconnection of cables and cords.

Turning now to the drawings, a telecommunications patching assembly, designated broadly at 10, is illustrated in FIG. 1. The rack 10 includes a frame 12 having two vertical, spaced apart uprights 14. Each of the uprights 14 includes mounting holes 16 for the mounting of patching systems 20, which are mounted via mounting ears 18. Although only one patching system 20 is shown mounted therein, the rack 10 may (and typically will) include multiple patching systems 20.

Figure 3:
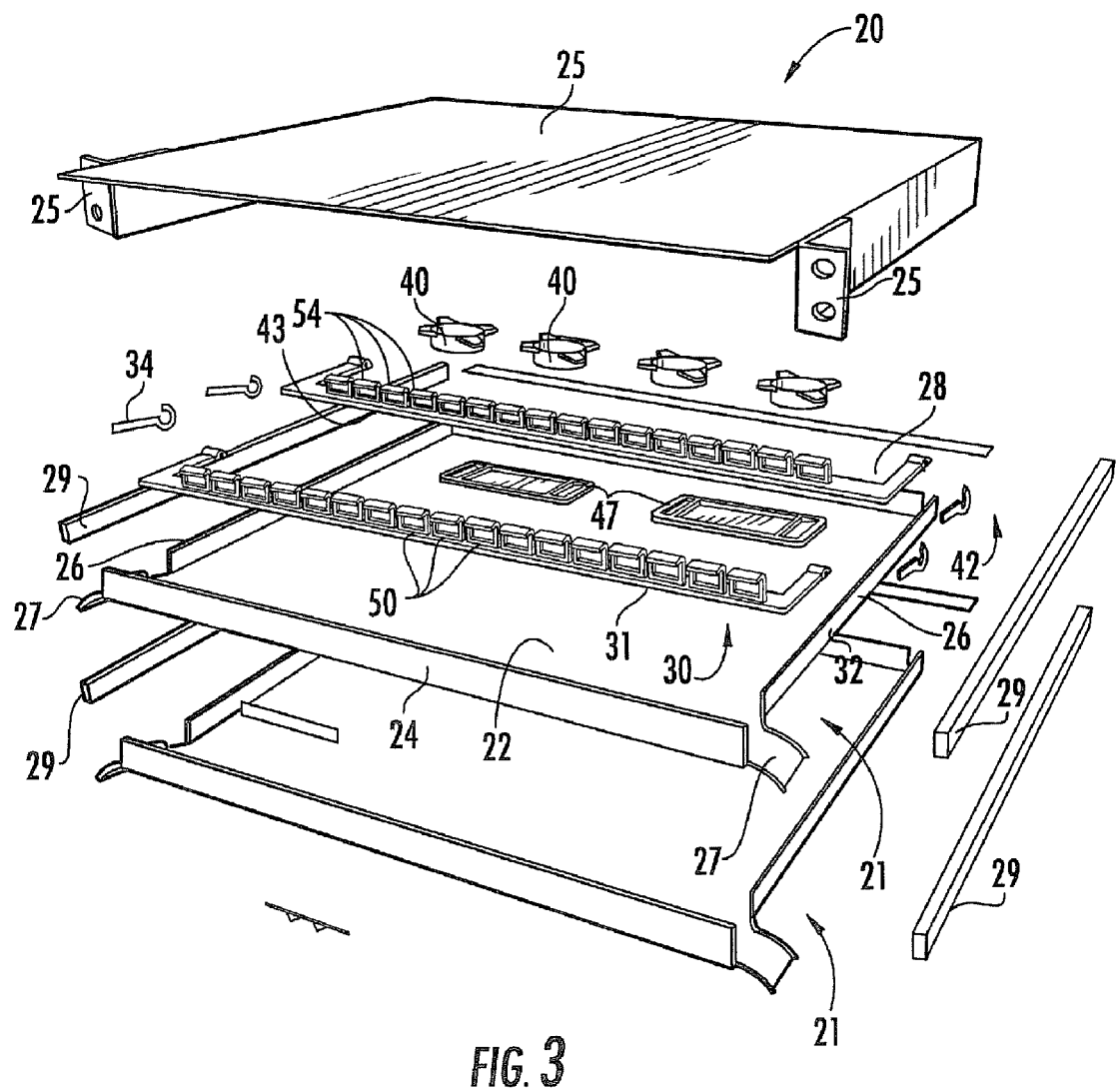
FIG. 3 is an exploded perspective view of the patching system of FIG. 1.

Turning now to FIG. 3, the patching system 20 includes two carriers 21. These carriers 21 as illustrated are substantially identical to each other, so only the upper carrier 21 will be described in detail herein, with the understanding that the discussion is equally applicable to the lower carrier 21 also. As can be seen in FIG. 3, a cover 25 may be included to provide protection for the carriers 21 from external contaminants and the like.

Figure 4:
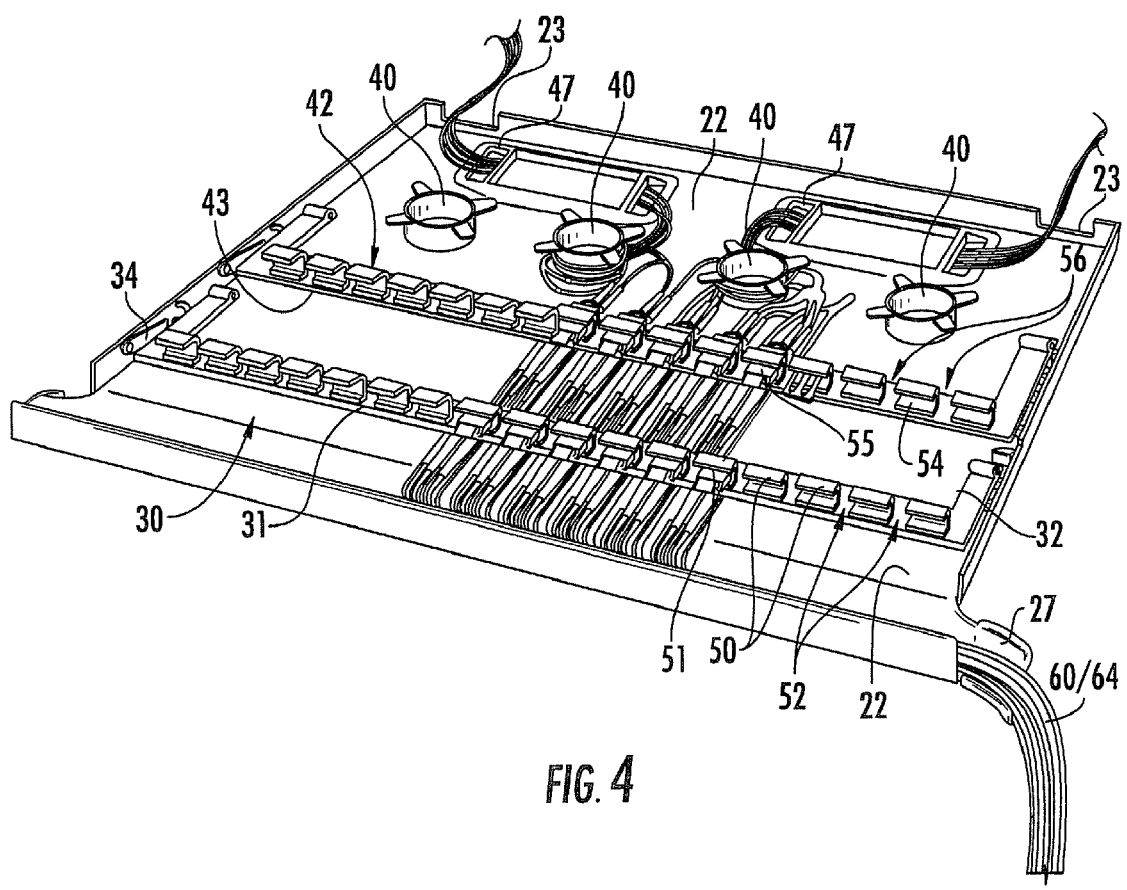
FIG. 4 is a front perspective view of a carrier of the patching system of FIG. 1 shown with some patch cords connected to the front and rear connectors.

Referring still to FIG. 3, the carrier 21 has a generally horizontal main panel 22. The main panel 22 is generally planar. A front wall 24 merges with and rises from the front edge of the main panel 22, a rear wall 28 merges with and rises from the rear edge of the main panel 22, and side walls 26 merge with and rise from the side edges of the main panel 22. Chutes 27 feed from open areas between the front edge of each side wall 26 and the front wall 24, and recesses 23 are present near the ends of the rear wall 28. Also, a plurality of fiber slack storage spools 40 (four are shown in FIGS. 3 and 4) are mounted to rear sections of the main panel 22, and splice trays 47 are positioned to the rear of the spools 40. In addition, drawer slides 29 are attached to the side walls 26 to enable the carrier 21 to slide forwardly and rearwardly relative to the frame 12 for easier access for a technician working on the carrier 21.

Figure 5:
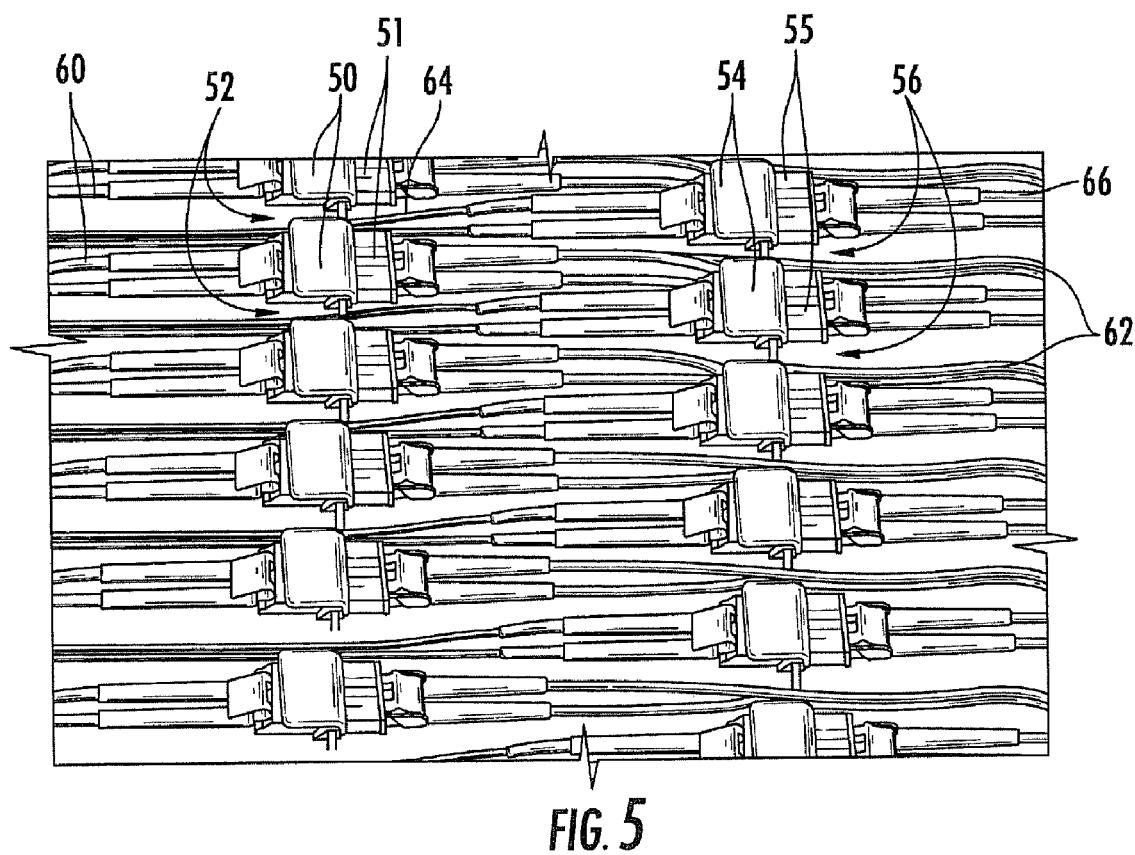
FIG. 5 is a greatly enlarged top view of a portion of the front and rear sets of connectors of the patching system of FIG. 1.
Figure 6A:
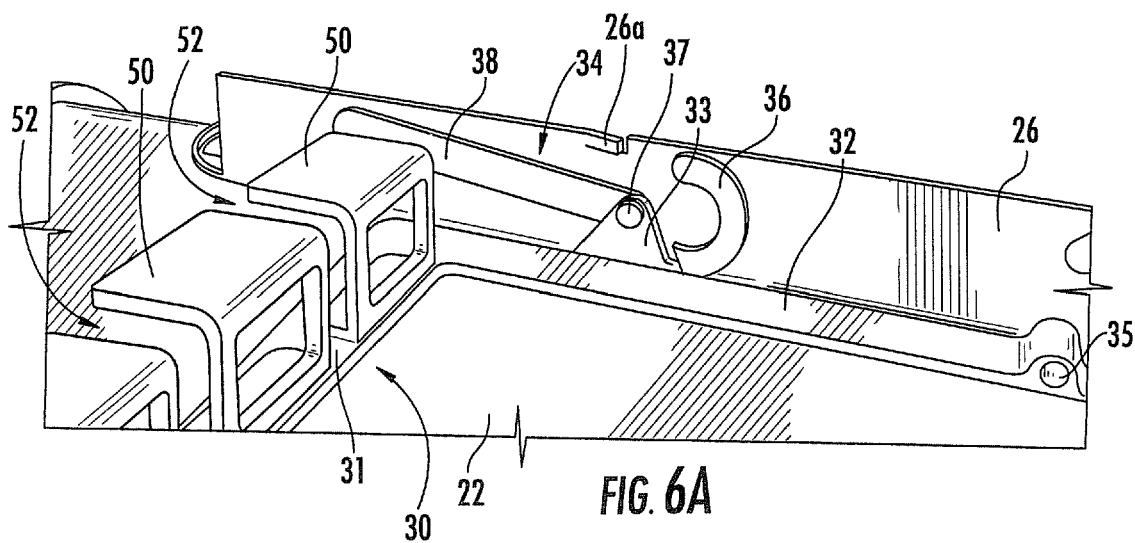
FIG. 6A is a greatly enlarged partial rear perspective view of the front connector lift of the carrier of FIG. 2, with the connectors shown in a retracted position.

Referring to FIGS. 3, 4 and 6A, the carrier 21 also includes a front connector lift 30. The front connector lift 30 includes a strip 31 that substantially spans the width of the main panel 22. A row of front connector holders 50 is mounted on the strip 31. The holders 50 are, in this embodiment, illustrated to receive fiber optic adapters 51 that are oriented to receive patch cords 60, 62 (see FIG. 5) from the front and rear. The front connector holders 50 are mounted such that gaps 52 are present between immediately adjacent connectors 50; the gaps 52 are sized to receive two patch cords and are typically between about 0.020 and 0.125 inch in width.

Referring now to FIG. 6A, a finger 32 of the front connector lift 30 extends rearwardly from each end of the strip 31 and is attached to the side wall 26 at a pivot 35. A hinge tab 33 extends upwardly from an intermediate section of the finger 32. A connector lift lever 34 has an arm 38 and a cam portion 36. The hinge tab 33 is attached to the lower end of the arm 38 at a pivot 37. As can be seen in FIG. 6A, the cam portion 36 may be received within a recess 39 in the side wall 26. Also, a small cantilever latch 26a is formed in the side wall 26.

The carrier 21 also includes a rear connector lift 42 that is similar in configuration to the front connector lift 30. The rear connector lift 42 has a strip 43 (FIGS. 3 and 4) on which are mounted rear connector holders 54 that hold connectors (in this embodiment, illustrated as fiber optic adapters 55) separated by gaps 56 (the gaps 56 are sized similarly to the gaps 52). Like the adapters 51 mounted in the front connector holders 50, the adapters 55 mounted in the rear connector holders 54 are oriented so that they can receive patch cords 64, 66 from the front and rear (see FIG. 5). FIG. 5 illustrates that the front connector holders 50 and adapters 51 are positioned to be laterally offset from the rear connector holders 54 and adapters 55, such that the gaps 56 align with the adapters 51 and the gaps 52 align with the adapters 55.

Referring now to FIGS. 4 and 5, the arrangement of patch cords and connectors can be seen therein. The front adapters 51 receive patch cords 60 from the front (which are routed to the front adapters 51 via the chutes 27) and patch cords 62 from the rear (which are routed from the front adapters 51 through the recesses 23 and via the splice trays 47). As shown in FIG. 5, the patch cords 62 pass through the gaps 56 between the rear connector holders 54 and adapters 55 as they are routed from the front adapters 51 to the rear apertures 23. Similarly, the rear adapters 55 receive the patch cords 64 from the front (via the chutes 27) and patch cords 66 from the rear (via the recesses 23 and splice trays 47). In traveling from the chutes 27 to the rear adapters 55, the patch cords 64 pass through the gaps 52 between the front connector holders 50.

Because all of the patch cords 60, 62, 64, 66 can be routed along the surface of the main panel 22, the carrier 21 may be relatively short in height (i.e., only slightly taller than the height of the front and rear connector holders 50, 54). As such, two different carriers 21 can be mounted onto the frame 12 in stacked relationship and occupy only a single U in height. Consequently, the port density of the system 20 can be quite high. For example, the illustrated embodiment has 17 front connector holders 50 and 16 rear connector holders 54 for a total of 33 total connectors for the carrier 21. If two such carriers 21 are fully populated, the system 20 can provide 66 ports/U.

Figure 2:
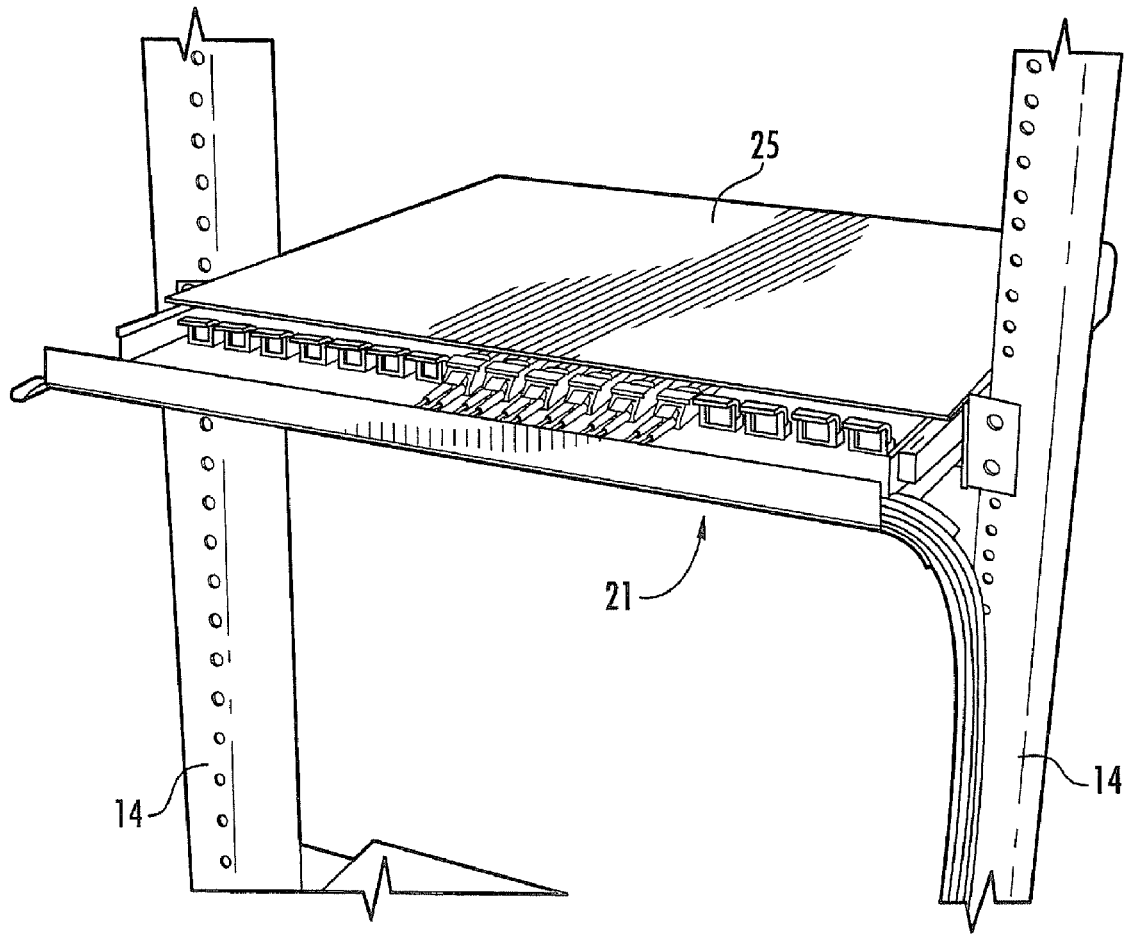
FIG. 2 is a front perspective view of a carrier and cover of the patching system of FIG. 1 with one carrier partially slid into an access position.

Either of the carriers 21 may be slid forwardly on the drawer slides 29 to provide access to the connectors. FIG. 2 shows one of the carriers 21 slid forward to a position in which the front connectors 50 can be accessed; of course, the carrier 21 may slide farther forward in order to provide access to the rear connectors 54 also.

Figure 6B:
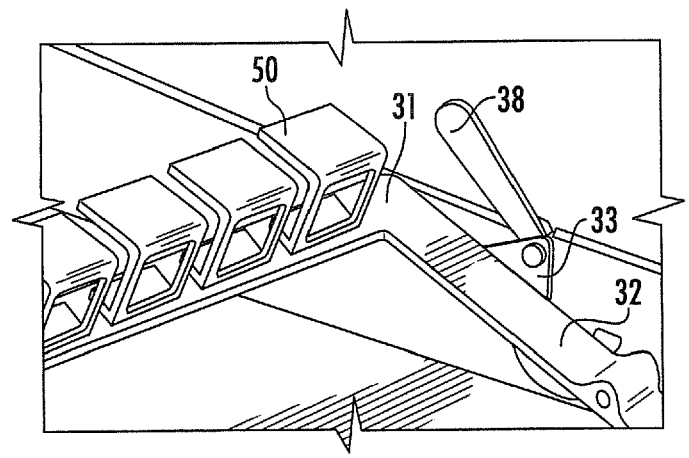
FIG. 6B is a greatly enlarged side view of the front connector lift of FIG. 6B shown in its raised position.

Because the front and rear connectors 50, 54 are densely mounted on the main panel 22, it may be desirable for a technician to have the option of lifting the connectors 50, 54 for easier access. Either of the front or rear connectors 50, 54 can be lifted as a group from a retracted position via the front or rear connector lifts 30, 42. With reference to FIGS. 6A and 6B, which illustrates the front connector lift 30, after the carrier 21 is slid forward from the frame 12 on the drawer slides 29, the technician can lift the arm 38 of the connector lift lever 34. This action causes the connector lift lever 34 to pivot about the pivot 37 (this rotation is clockwise from the vantage point of FIGS. 6A and 6B), which forces the cam section 36 downwardly into the main panel 22. Interaction between the cam section 36 and the main panel drives the pivot 37 upwardly, which induces the fingers 32 to rotate about the pivots 35 (this rotation is also clockwise from the vantage point of FIGS. 6A and 6B). Rotation of the fingers 32 lifts the strip 31 and the front connectors 50 mounted thereon to a height at which they can be easily accessed (FIG. 6B). The front connector lift 30 can be maintained in a raised position through the arm 38 being retained by the cantilever latch 26a, then returned to the retracted position by releasing the arm 38 from the latch 26a.

The rear connector lift 42 can be operated in the same manner as the front connector lift 30 to raise the rear connectors 54 for easier access for a technician.

Those skilled in this art will appreciate that many variations of these concepts may also be employed. For example, the connector lifts may be omitted, and the connectors may be mounted directly to the main panel 22 or a similar structure. Alternatively, another connector lift mechanism may be used. In some embodiments, the connector lifts may be coupled, such that both the front and rear connectors rise at the same time. In such embodiments, automatic actuation may be provided, such that the action of sliding the drawer forward to provide access to the connectors also causes the connectors to be lifted.

Other potential variations include different numbers of connectors in the front and rear rows, different spacing between the connectors, different techniques for causing the carriers to slide forwardly from the frame, different numbers and positions of fiber guides and slack storage spools, rear apertures and chutes, and the like. Other embodiments will be apparent to those of skill in this art.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A telecommunications patching system, comprising:
a main panel;
a row of front connectors;
a row of rear connectors; and
a first set of patch cords connected with the front connectors, wherein the patch cords of the first set are routed through gaps between the rear connectors;
wherein the row of front connectors is mounted on a first connector lift mounted to the main panel, the first connector lift being configured to move the row of front connectors mounted thereon between a retracted position and a raised position; and
wherein the row of rear connectors is mounted on a second connector lift mounted to the main panel, the second connector lift being configured to move the row of rear connectors between a retracted position and a raised position; and
wherein the first connector lift is pivotally interconnected with the main panel, the first connector lift pivotable about an axis that is generally perpendicular to the first set of patch cords.

2. The patching system defined in claim 1, wherein the first connector lift includes a connector lift lever that interacts with the main panel to raise the connectors to their raised position.

3. The patching system defined in claim 1, further comprising a second set of patch cords connected with the rear connectors, wherein the patch cords of the second set of patch cords are routed through gaps between the front connectors.

4. The patching system defined in claim 3, wherein the main panel includes a chute located at a front side edge thereof through which some of the second set of patch cords are routed.

5. The patching system defined in claim 4, wherein the main panel further includes at least one aperture located to the rear of the rear connectors through which some of the first set of patch cords are routed.

6. A telecommunications patching system, comprising:
a pair of carriers, each of the carriers comprising:
a main panel;
a row of front connectors;
a row of rear connectors; and
a first set of patch cords connected with the front connectors,
wherein the row of front connectors is mounted on a first connector lift mounted to the main panel, the first connector lift being configured to move the row of front connectors mounted thereon between a retracted position and a raised position; and
wherein the row of rear connectors is mounted on a second connector lift mounted to the main panel, the second connector lift being configured to move the row of rear connectors between a retracted position and a raised position;
wherein the carriers are arranged in vertically stacked relationship;
wherein the height of the pair of carriers is about 1 U;
wherein the first connector lift is pivotally interconnected with the main panel;
wherein each of the front connectors is spaced apart from immediately adjacent front connectors by a gap, and each of the rear connectors is spaced apart from immediately adjacent rear connectors by a gap; and
wherein the patch cords of the first set of patch cords are routed through the gaps in the rear connectors; and
wherein the first connector lift is pivotable about an axis that is generally perpendicular to the first set of patch cords.

7. The patching assembly defined in claim 6, wherein the front connectors are laterally offset from the rear connectors such that each of the gaps between the rear connectors aligns with a respective front connector, and each of the gaps between the front connectors aligns with a respective rear connector.

8. The patching assembly defined in claim 7, further comprising a second set of patch cords connected with the rear connectors, wherein the patch cords of the second set are routed through the gaps between the front connectors.

* * * * *